United States Patent
Yoshida et al.

(10) Patent No.: US 12,091,532 B2
(45) Date of Patent: Sep. 17, 2024

(54) ETHYLENE-(VINYL ALCOHOL) COPOLYMER AND METHOD FOR PRODUCING SAME

(71) Applicant: KURARAY CO., LTD., Okayama (JP)

(72) Inventors: Kentaro Yoshida, Kurashiki (JP); Masako Katayama, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 526 days.

(21) Appl. No.: 17/603,927

(22) PCT Filed: Apr. 15, 2019

(86) PCT No.: PCT/JP2019/016214
§ 371 (c)(1),
(2) Date: Oct. 14, 2021

(87) PCT Pub. No.: WO2020/213046
PCT Pub. Date: Oct. 22, 2020

(65) Prior Publication Data
US 2022/0195159 A1  Jun. 23, 2022

(51) Int. Cl.
*C08F 216/06* (2006.01)
*C08F 4/46* (2006.01)
*C08K 5/09* (2006.01)
*C08L 23/08* (2006.01)

(52) U.S. Cl.
CPC .......... *C08L 23/0861* (2013.01); *C08F 4/463* (2013.01); *C08K 5/09* (2013.01); *C08L 2201/14* (2013.01); *C08L 2203/30* (2013.01)

(58) Field of Classification Search
CPC .. C08F 2810/40; C08F 216/06; C08F 210/02; C08F 8/16
See application file for complete search history.

(56) References Cited

U.S. PATENT DOCUMENTS

| | | | |
|---|---|---|---|
| 5,032,632 A | 7/1991 | Saxton | |
| 5,744,547 A | 4/1998 | Moritani et al. | |
| 6,552,123 B1 * | 4/2003 | Katayama | D04H 3/16 525/61 |
| 2002/0100997 A1 | 8/2002 | Kawahara et al. | |
| 2007/0106031 A1 * | 5/2007 | Uchiumi | C08F 8/12 525/330.6 |
| 2012/0248640 A1 | 10/2012 | Tsuboi et al. | |
| 2013/0017383 A1 * | 1/2013 | Tai | B32B 27/32 428/220 |
| 2015/0105508 A1 | 4/2015 | Nakazawa et al. | |
| 2017/0183426 A1 | 6/2017 | Kawai et al. | |
| 2018/0194876 A1 * | 7/2018 | Yoshida | B32B 27/08 |
| 2022/0153891 A1 | 5/2022 | Fukuhara et al. | |

FOREIGN PATENT DOCUMENTS

| | | |
|---|---|---|
| CN | 105879850 A | 8/2016 |
| EP | 2554372 A1 | 2/2013 |
| EP | 3733766 A1 | 11/2020 |
| JP | H04-227744 A | 8/1992 |
| JP | H06-206929 A | 7/1994 |
| JP | H09-71620 A | 3/1997 |
| JP | H11-60874 A | 3/1999 |
| JP | 2002-284811 A | 10/2002 |
| JP | 2016-29159 A | 3/2016 |
| WO | 2004/092234 A1 | 10/2004 |
| WO | 2011/125739 A1 | 10/2011 |
| WO | 2013/146961 A1 | 10/2013 |

OTHER PUBLICATIONS

International Search Report issued in corresponding International Patent Application No. PCT/JP2019/016214 dated Jun. 18, 2019.
Extended European Search Report issued in corresponding European Patent Application No. 19925212.3 dated Nov. 14, 2022.

* cited by examiner

*Primary Examiner* — Robert C Boyle
(74) *Attorney, Agent, or Firm* — Morgan, Lewis & Bockius LLP

(57) ABSTRACT

Provided is an ethylene-vinyl alcohol copolymer with an ethylene unit content of 15 to 60 mol % and a saponification degree of 85 mol % or more.

7 Claims, No Drawings

ETHYLENE-(VINYL ALCOHOL) COPOLYMER AND METHOD FOR PRODUCING SAME

TECHNICAL FIELD

The present invention relates to an ethylene-vinyl alcohol copolymer, and a resin composition containing the copolymer and a shaped article thereof, and a method for producing the copolymer.

BACKGROUND ART

Ethylene-vinyl alcohol copolymers (which may hereinafter be abbreviated as "EVOHs") are excellent in gas barrier properties and melt moldability and are thus molded into films, sheets, pipes, tubes, bottles, and the like by various melt molding methods to be widely used as packaging materials expected to have gas barrier properties in the fields of foods and industries. In order to stably produce packaging materials with uniform performance and quality such as gas barrier properties, mechanical properties, and appearance, the melt viscosity of EVOHs preferably changes little with time. However, the behavior of changes in melt viscosity over time is complex since various crosslinking reactions and various decomposition reactions competitively occur in EVOHs having a large number of active reactive groups at the molecular ends and in the molecular chains. Such changes in melt viscosity over time may trigger fluctuations in the resin pressure and the resin temperature during melt molding and the thickness distribution of the shaped article and may cause problems in the melt molding step or the performance of a shaped article to be obtained.

In order to improve the long-term stability of the melt viscosity of EVOHs (which may hereinafter be abbreviated as "long-run workability") to stably produce packaging materials with uniform performance and quality as mentioned above, various EVOH-containing resin compositions have been proposed. For example, Patent Document 1 discloses a resin composition containing an EVOH, a boron compound, sodium acetate, and magnesium acetate. Further, it is disclosed that the resin composition improves the long-run workability during melt molding. Patent Document 2 discloses a resin composition containing an EVOH and a conjugated polyene compound. Further, it is disclosed that the resin composition suppresses the generation of gels and lumps due to melt molding. Patent Document 3 discloses a resin composition containing an EVOH, a specific carboxylic acid metal salt, and a hindered phenol-based antioxidant. Further, it is disclosed that the resin composition has excellent thermostability and suppresses formation of oxidative gels at high temperature. Patent Document 4 discloses a resin composition containing an EVOH and a specific unsaturated aldehyde. Further, it is disclosed that the resin composition suppresses the generation of defects such as fish-eyes and gels due to melt molding to improve the long-run workability during melt molding.

PRIOR ART DOCUMENTS

Patent Documents

Patent Document 1: JP 11-60874 A
Patent Document 2: JP 9-71620 A
Patent Document 3: JP 4-227744 A
Patent Document 4: WO 2013/146961 A1

SUMMARY OF THE INVENTION

Problems to be Solved by the Invention

It has been proved that the EVOH-containing resin composition has a certain effect for suppressing the gel formation of the resin remaining in the extruder for a long time and controlling the melt viscosity but has insufficient viscosity stability at the initial stage of melting start. Therefore, the temperature and the pressure of the resin are not constant, and the resin discharge rate during melt molding is uneven, for example, so that the melt molding process is still unstable, and there may be variations in various performances such as gas barrier properties and mechanical properties of a shaped article to be obtained. Further, coloration may occur at high temperature (for example, 80° C.) under alkaline conditions in some cases. Accordingly, it is an object of the present invention to provide an EVOH having excellent viscosity stability at the initial stage of melting start so as to be able to stabilize the melt molding process and excellent coloration resistance at high temperature (for example, 80° C.) under alkaline conditions.

Means for Solving the Problems

As a result of diligent studies, the inventors have found that, in the case of melt molding a conventional EVOH-containing resin composition, phenomena in which the viscosity suddenly increases at the initial stage of melting start (5 to 20 minutes after the melting start), then gradually decreases for several tens of minutes, and again increases are widely observed, and such a complex change in viscosity causes destabilization of the melt molding process. Further, they have found that such a viscosity behavior, particularly, the sudden increase in viscosity at the initial stage of melting start significantly relates to the terminal structure derived from the polymerization initiator of the molecules constituting the EVOH. Then, they have accomplished the EVOH of the present invention containing a molecule having a specific terminal structure.

That is, the present invention is as follows.

[1] An EVOH having an ethylene unit content from 15 to 60 mol % and a saponification degree of 85 mol % or more, wherein the copolymer comprises a molecule having a structure (I) below at an end and a molecule having a structure (II) below at an end, a total content of the structure (I) and the structure (II) in all monomer units is from 0.002 to 0.020 mol %, and a molar ratio R [I/(I+II)] of the structure (I) to the total of the structure (I) and the structure (II) satisfies formula (1) below:

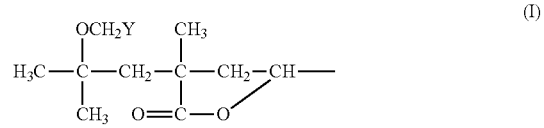

(I)

wherein Y represents a hydrogen atom or a methyl group;

(II)

wherein Z represents a hydrogen atom or a methyl group; and $$0.8 < R + Et/100 \qquad (1)$$

wherein Et represents the ethylene unit content (mol %).

[2] The EVOH according to [1], satisfying formula (2) below:

$$0.9 < R + Et/100 \qquad (2)$$

wherein R and Et are the same as in formula (1).

[3] A resin composition comprising: the EVOH according to [1] or [2]; and 100 to 400 ppm of metal ions.

[4] The resin composition according to [3], comprising: 50 to 400 ppm of carboxylic acid.

[5] A shaped article comprising: the EVOH according to [1] or [2].

[6] A shaped article comprising: the resin composition according to [3] or [4].

[7] A method for producing the EVOH according to [1] or [2], comprising: a copolymerization step of obtaining an ethylene-vinyl ester copolymer solution by copolymerization of ethylene with vinyl ester in a solution using an azonitrile compound containing an alkoxy group as a polymerization initiator; and a saponification step of obtaining the EVOH by saponification of the ethylene-vinyl ester copolymer in the solution with an alkali catalyst, wherein in the saponification step, the alkali catalyst is used in an amount of 1.2 mol or more per mole of vinyl ester component contained in the ethylene-vinyl ester copolymer, and the solution is irradiated with ultrasonic waves or microwaves.

Effects of the Invention

The EVOH of the present invention has excellent viscosity stability at the initial stage of melting start so as to be able to stabilize the melt molding process and excellent coloration resistance at high temperature (for example, 80° C.) under alkaline conditions.

MODES FOR CARRYING OUT THE INVENTION

<Ethylene-Vinyl Alcohol Copolymer>

The EVOH of the present invention has an ethylene unit content from 15 to 60 mol % and a saponification degree of 85 mol % or more, wherein the copolymer comprises a molecule having a structure (I) below at an end and a molecule having a structure (II) below at an end, a total content of the structure (I) and the structure (II) in all monomer units is from 0.002 to 0.020 mol %, and a molar ratio R [I/(I+II)] of the structure (I) to the total of the structure (I) and the structure (II) satisfies formula (1) below:

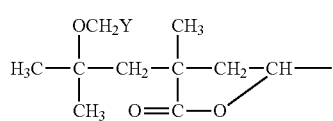
(I)

wherein Y represents a hydrogen atom or a methyl group;

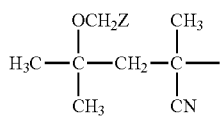
(II)

wherein Z represents a hydrogen atom or a methyl group; and $$0.8 < R + Et/100 \qquad (1)$$

wherein Et represents the ethylene unit content (mol %).

The EVOH of the present invention has ethylene units and vinyl alcohol units as main structural units. The EVOH further contains vinyl ester units as optional components. The EVOH of the present invention comprises a molecule having the structure (I) at an end and a molecule having the structure (II) at an end. The total content of the structure (I) and the structure (II) is from 0.002 to 0.020 mol % in all monomer units of the EVOH. This improves the viscosity stability of the EVOH at the initial stage of melting start. Meanwhile, in the case where the total content is more than 0.020 mol %, a shaped article to be obtained may be colored under alkaline conditions, or appearance abnormalities such as foaming may occur during melt molding at high temperature. The total content is preferably 0.012 mol % or less. Meanwhile, in order to reduce the total content to less than 0.002 mol %, it is necessary to highly reduce the polymerization rate, which is not practical from an economical point of view. In this description, the monomer units in the ethylene-vinyl alcohol copolymer mean ethylene units, vinyl alcohol units, vinyl ester units, and other monomer units copolymerized therewith as required, and all monomer units mean the total amount of moles of such monomer units. At this time, units containing the terminal structure represented by the structure (I) or the structure (II) are also included in the monomer units for calculation.

In the EVOH of the present invention, it is necessary that the molar ratio R [I/(I+II)] of the structure (I) to the total of the structure (I) and the structure (II) satisfy formula (1) below, preferably satisfy formula (2) below:

$$0.8 < R + Et/100 \qquad (1); \text{ and}$$

$$0.9 < R + Et/100 \qquad (2),$$

wherein Et represents the ethylene unit content (mol %).

Here, the right-hand sides of formulas (1) and (2) are each the sum of the molar ratio R [I/(I+II)] of the structure (1) to the total of the structure (1) and the structure (II) in the EVOH and the molar ratio (ethylene units/all monomer units) of ethylene units to all monomer units in the EVOH.

Formulas (1) and (2) indicate that the sum needs to be larger than a certain numerical value, and that when Et is small, the molar ratio R needs to be a large value. As will be described below, the structure (1) and the structure (II) are each a structure derived from the polymerization initiator used in the polymerization step. Among them, the structure (1) includes a cyclic ester structure to be formed by the reaction between a nitrile group derived from the polymerization initiator and a hydroxyl group in the same molecule, and the structure (II) is a structure before the reaction. Accordingly, large values on the right-hand sides of formulas (1) and (2) indicate that the proportion of the nitrile group derived from the polymerization initiator which has been converted into the cyclic ester structure is high, and formula (2) indicates that the proportion is still higher. Satisfying formula (1) improves the viscosity stability of the EVOH of the present invention at the initial stage of melting start and thus can suppress the sudden increase in viscosity at the initial stage of melting start (5 to 20 minutes after the melting start), and satisfying formula (2) can further suppress such increase in viscosity.

The reason for exhibiting such characteristics is not clear, but it is presumed as follows. It is presumed that the presence of the structure (II) is likely to cause a crosslinking reaction between molecules in a molten state. Meanwhile, since the structure (I) is a structure in which cyclization within the same molecule has already occurred, it is considered that such a crosslinking reaction is unlikely to occur even in the presence of the structure (I). From these facts, it is presumed that the increase in viscosity at the initial stage of melting start can be suppressed. The contents of the structure (I) and the structure (II) and their molar ratio R [I/(I+II)] can be determined by nuclear magnetic resonance (NMR).

For further improving the viscosity stability at the initial stage of melting start, the molar ratio R [I/(I+II)] of the structure (I) to the total of the structure (I) and the structure (II) in the EVOH of the present invention is preferably 0.5 or more, more preferably 0.6 or more. Meanwhile, the molar ratio R [I/(I+II)] is preferably 0.99 or less.

The ethylene unit content in the EVOH of the present invention (i.e., a ratio of the number of moles of ethylene units to the total number of moles of all monomer units of the EVOH) falls within a range from 15 to 60 mol %. The lower limit of the ethylene unit content in the EVOH is preferably 20 mol %, more preferably 23 mol %. Meanwhile, the upper limit of the ethylene unit content in the EVOH is preferably 55 mol %, more preferably 50 mol %. If the ethylene unit content in the EVOH is less than 15 mol %, the gas barrier properties under high humidity decrease and the melt moldability may also deteriorate. In contrast, if the ethylene unit content in the EVOH is more than 60 mol %, the gas barrier properties may be insufficient. The ethylene unit content and the saponification degree of the EVOH can be determined by nuclear magnetic resonance (NMR).

The saponification degree of the EVOH (i.e., a ratio of the number of moles of vinyl alcohol units to the total number of moles of vinyl alcohol units and vinyl ester units in the EVOH) is 85 mol % or more. The lower limit of the saponification degree of the EVOH is preferably 95 mol %, more preferably 99 mol %. Meanwhile, the upper limit of the saponification degree of the EVOH is preferably 100 mol %, more preferably 99.99 mol %. If the saponification degree of the EVOH is less than 85 mol %, the gas barrier properties may be insufficient, and further the thermostability may be insufficient.

The lower limit of the melt flow rate of the EVOH according to JIS K 7210:2014 (at a temperature of 210° C. under a load of 2160 g, which may hereinafter be abbreviated as "MFR") is generally 0.1 g/10 minutes, and the upper limit is generally 50 g/10 minutes.

The EVOH can contain monomer units other than the ethylene units, the vinyl alcohol units and the vinyl ester units as copolymerization units, without inhibiting the effects of the present invention. Examples of such monomers may include: α-olefins, such as propylene, 1-butene, isobutene, pentene, 1-hexene, and 1-octene; unsaturated carboxylic acids, such as itaconic acid, methacrylic acid, acrylic acid, and maleic acid, salts thereof, partial or complete esters thereof, nitriles thereof, amides thereof, and anhydrides thereof; vinylsilane compounds, such as vinyltrimethoxysilane, vinyltriethoxysilane, vinyltri(β-methoxyethoxy)silane, and γ-methacryloxypropyltrimethoxysilane; unsaturated sulfonic acids and salts thereof; unsaturated thiols; and vinyl pyrrolidones. The content of the monomer units other than the ethylene units, the vinyl alcohol units, and the vinyl ester units in the EVOH is generally 5 mol % or less, preferably 2 mol % or less, more preferably 1 mol % or less.

A resin composition containing the EVOH is a preferred embodiment of the present invention. The content of the EVOH in the resin composition is generally 70 mass % or more, preferably 80 mass % or more, more preferably 90 mass % or more. The content of the EVOH falling within such a range improves the melt moldability of the resin composition of the present invention and allows a shaped article to be obtained to have excellent gas barrier properties and excellent oil resistance. In the resin composition of the present invention, the resin contained in the resin composition may substantially consist only of EVOH or may consist only of EVOH.

<Metal Ions>

The resin composition of the present invention preferably further contains metal ions. The resin composition of the present invention containing metal ions exhibits excellent interlayer adhesion when formed into a multilayer shaped article, that is, a multilayer structure. Although the reason why the interlayer adhesion is improved is not clear, it is considered that, when molecules having functional groups capable of reacting with the hydroxy groups in the EVOH are contained in a layer adjacent to the layer of the resin composition, the bonding reaction between the layers is accelerated by the metal ions. In addition, control of the content ratio of metal ions to carboxylic acid improves the melt moldability and the coloration resistance of the resin composition of the present invention.

In the case where the resin composition of the present invention contains metal ions, the lower limit of the content is preferably 100 ppm, more preferably 150 ppm. Meanwhile, the upper limit of the content of the metal ions is preferably 400 ppm, more preferably 350 ppm. If the content of the metal ions is less than 100 ppm, the interlayer adhesion of the multilayer structure to be produced may be insufficient. In contrast, if the content of the metal ions is more than 400 ppm, coloration resistance may be insufficient.

Examples of the metal ions may include alkali metal ions, alkaline earth metal ions, and other transition metal ions, and they may include one or multiple types. Among all, alkali metal ions are preferred. From the perspective of simplified production of the resin composition and further improvement in the interlayer adhesion of the multilayer structure, it is preferred that the metal ions consist only of alkali metal ions.

Examples of the alkali metal ions may include ions of lithium, sodium, potassium, rubidium, and cesium, and from the perspective of industrial availability, ions of sodium or potassium are preferred. Examples of alkali metal salt to provide the alkali metal ions may include salts of aliphatic carboxylic acid, salts of aromatic carboxylic acid, salts of carbonic acid, salts of hydrochloric acid, salts of nitric acid, salts of sulfuric acid, salts of phosphoric acid, and metal complexes. Among all, sodium acetate, potassium acetate, sodium phosphate, and potassium phosphate are more preferred from the perspective of availability.

It is sometimes preferred that the metal ions contain alkaline earth metal ions. The metal ions containing alkaline earth metal ions inhibit thermal degradation of the EVOH, for example, when trimmed portions are recovered and reused and may inhibit generation of gels and hard spots in the shaped article to be produced. Examples of the alkaline earth metal ions may include ions of beryllium, magnesium, calcium, strontium, and barium, and from the perspective of industrial availability, ions of magnesium or calcium are preferred. Examples of alkaline earth metal salt to provide the alkaline earth metal ions may include salts of aliphatic carboxylic acid, salts of aromatic carboxylic acid, salts of carbonic acid, salts of hydrochloric acid, salts of nitric acid, salts of sulfuric acid, salts of phosphoric acid, and metal complexes.

<Carboxylic Acid>

The resin composition of the present invention preferably further contains carboxylic acid. The resin composition of the present invention containing the carboxylic acid can improve the melt moldability and the coloration resistance at high temperatures of the resin composition of the present invention. In particular, from the perspective of the possibility of an increase in pH buffer capacity of the resin composition to be obtained to improve coloration resistance to acidic substances and basic substances, the carboxylic acid more preferably has a pKa ranging from 3.5 to 5.5.

In the case where the resin composition of the present invention contains carboxylic acid, the lower limit of the content is preferably 50 ppm, more preferably 100 ppm. Meanwhile, the upper limit of the content of the carboxylic acid is preferably 400 ppm, more preferably 350 ppm. If the content of the carboxylic acid is less than 50 ppm, the coloration resistance at high temperatures may be insufficient. In contrast, if the content of the carboxylic acid is more than 400 ppm, the melt moldability may be insufficient, or a problem of odor may occur. The content of carboxylic acid in the resin composition is calculated by titrating an extract obtained by extracting 10 g of the resin composition with 50 ml of pure water at 95° C. for 8 hours. In this context, the content of carboxylic acid salts present in the extract is not considered as the content of the carboxylic acid in the resin composition.

Examples of the carboxylic acid may include monovalent and polyvalent carboxylic acids and they may include one or multiple types. When both monovalent and polyvalent carboxylic acids are contained as the carboxylic acid, the melt moldability and the coloration resistance at high temperatures of the resin composition to be obtained may be further improved. The polyvalent carboxylic acid may have three or more carboxyl groups. In this case, the coloration resistance of the resin composition of the present invention may be further improved.

The monovalent carboxylic acid is a compound having one carboxyl group in the molecule. The monovalent carboxylic acid preferably has a pKa ranging from 3.5 to 5.5. Examples of such monovalent carboxylic acid may include formic acid (pKa=3.77), acetic acid (pKa=4.76), propionic acid (pKa=4.85), butyric acid (pKa=4.82), caproic acid (pKa=4.88), capric acid (pKa=4.90), lactic acid (pKa=3.86), acrylic acid (pKa=4.25), methacrylic acid (pKa=4.65), benzoic acid (pKa=4.20), 2-naphthoic acid (pKa=4.17), and the like. These carboxylic acids may have a substituent, such as a hydroxyl group, an amino group, and a halogen atom as long as the pKa falls within a range from 3.5 to 5.5. Among all, acetic acid is preferred because of the high level of safety and the ease of handling.

The polyvalent carboxylic acid is a compound having two or more carboxyl groups in the molecule. In this case, the pKa of at least one carboxyl group is preferably in a range from 3.5 to 5.5. Examples of such polyvalent carboxylic acid may include oxalic acid ($pKa_2$=4.27), succinic acid ($pKa_1$=4.20), fumaric acid ($pKa_2$=4.44), malic acid ($pKa_2$=5.13), glutaric acid ($pKa_1$=4.30, $pKa_2$=5.40), adipic acid ($pKa_1$=4.43, $pKa_2$=5.41), pimelic acid ($pKa_1$=4.71), phthalic acid ($pKa_2$=5.41), isophthalic acid ($pKa_2$=4.46), terephthalic acid ($pKa_1$=3.51, $pKa_2$=4.82), citric acid ($pKa_2$=4.75), tartaric acid ($pKa_2$=4.40), glutamic acid ($pKa_2$=4.07), and aspartic acid (pKa=3.90).

<Other Components>

The resin composition of the present invention may further contain other components without impairing the effects of the present invention. Examples of such other components may include phosphoric acid compounds, boron compounds, thermoplastic resins other than the EVOH, crosslinkers, desiccants, prooxidants, antioxidants, oxygen absorbents, plasticizers, lubricants, thermal stabilizers (melting stabilizers), processing aids, surfactants, deodorants, antistatics, ultraviolet absorbers, antifog agents, flame retardants, pigments, dyes, fillers, reinforcing agents such as various types of fiber.

In the case where the resin composition of the present invention contains a phosphate compound, the lower limit of the content is generally 1 ppm in terms of phosphate radicals. Meanwhile, the upper limit of the content is generally 200 ppm in terms of phosphate radicals. The phosphoric acid compound contained in this range may improve the thermal stability of the resin composition of the present invention. In particular, generation of gelatinous hard spots and coloration during long term melt molding may be inhibited. As the phosphoric acid compound, it is possible to use various acids, such as phosphoric acid and phosphorous acid, salts thereof, and the like. The salt of phosphoric acid may be in any form of primary phosphate, secondary phosphate, and tertiary phosphate. Examples of cationic species of phosphate include alkali metals and alkaline earth metals. Specifically, examples of the phosphate compound include phosphate compounds in the forms of sodium dihydrogen phosphate, potassium dihydrogen phosphate, disodium hydrogen phosphate, and dipotassium hydrogen phosphate.

In the case where the resin composition of the present invention contains a boron compound, the lower limit of the content is generally 5 ppm in terms of boron elements. Meanwhile, the upper limit of the content is generally 1000 ppm in terms of boron elements. The boron compound contained in this range improves the thermal stability of the resin composition of the present invention during melt molding and may also inhibits the generation of gelatinous hard spots. In addition, a shaped article to be produced may have improved mechanical properties. It is assumed that these effects are derived from generation of chelate interaction between the EVOH and the boron compound. Examples of the boron compound may include boric acids, borate esters, salts of boric acid, and boron hydrides. Specific examples of the boric acids may include orthoboric acid (H3B03), metaboric acid, and tetraboric acid; specific examples of the borate esters may include trimethyl borate and triethyl borate; and specific examples of the salts of boric acids may include alkali metal salts and alkaline earth metal salts of the above boric acids, borax, and the like.

Examples of the thermoplastic resins other than the EVOH may include various polyolefins (polyethylene, polypropylene, poly 1-butene, poly 4-methyl-1-pentene, ethylene-propylene copolymers, copolymers of ethylene and α-olefin having a carbon number of 4 or more, copolymers of polyolefin and maleic anhydride, ethylene-vinyl ester copolymers, ethylene-acrylic ester copolymers, modified polyolefins obtained by graft modifying them with unsaturated carboxylic acid or a derivative thereof, etc.), various polyamides (nylon 6, nylon 6, 6, nylon 6/66 copolymers, nylon 11, nylon 12, polymetaxylylene adipamide, etc.), various polyesters (polyethylene terephthalate, polybutylene terephthalate, polyethylene naphthalate, etc.), polyvinyl chloride, polyvinylidene chloride, polystyrene, polyacrylonitrile, polyurethane, polycarbonate, polyacetal, polyacrylate, modified polyvinyl alcohol resins, and the like. The thermoplastic resin content in the resin composition is generally less than 30 mass %, preferably less than 20 mass %, more preferably less than 10 mass %.

<Shaped Article>

A shaped article comprising the EVOH of the present invention is a preferred embodiment of the present invention. At this time, use of the resin composition as the EVOH is more preferred. The EVOH may be a shaped article having a monolayer structure or may be a shaped article having a multilayer structure of two or more types together with other various substrates, that is, a multilayer structure. Examples of the molding method include extrusion molding, thermoforming, profile molding, blow molding, rotational molding, and injection molding. The shaped article of the present invention is applied to a wide range of use, and examples thereof include films, sheets, containers, bottles, tanks, pipes, and hoses.

Specific examples of the molding method for films, sheets, pipes, and hoses may include extrusion molding, for container shapes may include injection molding, and for hollow containers such as bottles and tanks may include blow molding and rotational molding. Such blow molding may include: extrusion blow molding comprising forming a parison by extrusion molding and blowing the parison for molding; and injection blow molding comprising forming a preform by injection molding and blowing the preform for molding. Preferably used methods for producing flexible packaging materials and containers include a method comprising extrusion molding a packaging material, such as a multilayer film, and thermoforming an extrusion molded multilayer sheet to form a packaging material in a container shape.

<Multilayer Structure>

The shaped article is preferably a multilayer structure including a layer of the resin composition of the present invention. The multilayer structure is obtained by laminating a layer of the resin composition of the present invention and another layer. Examples of the layer structure of the multilayer structure may include, where an x layer denotes a layer of a resin other than the resin composition of the present invention, a y layer denotes a layer of the resin composition of the present invention, and a z layer denotes an adhesive resin layer, x/y, x/y/x, x/z/y, x/z/y/z/x, x/y/x/y/x, x/z/y/z/x/z/y/z/x, and the like. When a plurality of x layers, y layers, and z layers are provided, the types of them may be same or different. In addition, a layer using a recovered resin of scrap, such as trimmed portions produced during molding, may be separately provided or a recovered resin may be mixed in a layer of such another resin. As a thickness configuration of each layer in the multilayer structure, a thickness ratio of the y layer to the total layer thickness from the perspective of the moldability, the costs, and the like is generally from 2% to 20%.

The resin to be used for the x layer is preferably a thermoplastic resin from the perspective of the processability and the like. Examples of the thermoplastic resin may include various polyolefins (polyethylene, polypropylene, poly 1-butene, poly 4-methyl-1-pentene, ethylene-propylene copolymers, copolymers of ethylene and α-olefin having a carbon number of 4 or more, copolymers of polyolefin and maleic anhydride, ethylene-vinyl ester copolymers, ethylene-acrylic ester copolymers, modified polyolefins obtained by graft modifying them with unsaturated carboxylic acid or a derivative thereof, etc.), various polyamides (nylon 6, nylon 6, 6, nylon 6/66 copolymers, nylon 11, nylon 12, polymetaxylylene adipamide, etc.), various polyesters (polyethylene terephthalate, polybutylene terephthalate, polyethylene naphthalate, etc.), polyvinyl chloride, polyvinylidene chloride, polystyrene, polyacrylonitrile, polyurethane, polycarbonate, polyacetal, polyacrylate, modified polyvinyl alcohol resins, and the like. Such a thermoplastic resin layer may be non-oriented or uniaxially or biaxially oriented or rolled. Among them, polyolefins are preferred from the perspective of the moisture resistance, the mechanical properties, the economic efficiency, the heat sealing properties, and the like, and polyamides and polyesters are preferred from the perspective of the mechanical properties, the heat resistance, and the like.

Meanwhile, the adhesive resin to be used for the z layer needs only to be capable of adhering to each layer, and polyurethane-based or polyester-based one- or two-component curable adhesives, and carboxylic acid modified polyolefins are preferable, for example. The carboxylic acid modified polyolefins include: polyolefin-based copolymers containing unsaturated carboxylic acid or an anhydride thereof (maleic anhydride, etc.) as a copolymerization component; and graft copolymers obtained by grafting unsaturated carboxylic acid or an anhydride thereof onto polyolefin.

Examples of the method of producing the multilayer structure may include coextrusion molding, coextrusion blow molding, coinjection molding, extrusion lamination, coextrusion lamination, dry lamination, solution coating, and the like. The multilayer structure produced by such a method may be further subjected to reheating within the melting point of the EVOH or lower, followed by secondary processing by a method such as vacuum/compressed air deep drawing, blow molding, and press molding to have an intended shaped article structure. The multilayer structure may be reheated within the melting point of the EVOH or lower and uniaxially or biaxially oriented by a method, such as roll orientation, pantograph orientation, and inflation orientation, to produce an oriented multilayer structure.

<Method for Producing EVOH>

The method for producing an EVOH of the present invention comprises:
(i) a copolymerization step of copolymerizing ethylene with vinyl ester to obtain an ethylene-vinyl ester copolymer; and
(ii) a saponification step of saponifying the ethylene-vinyl ester copolymer with an alkali catalyst to obtain an ethylene-vinyl alcohol copolymer. In particular, for ease of production of the EVOH, it is highly preferred that the method for producing an EVOH comprise a copolymerization step of copolymerizing ethylene with vinyl ester in a solution using an azonitrile compound containing an alkoxy group as a polymerization initiator to obtain an ethylene-vinyl ester copolymer solution; and a saponification step of saponifying the ethylene-vinyl ester copolymer in the solution with an alkali catalyst to obtain an ethylene-vinyl alcohol copolymer, wherein in the saponification step, the alkali catalyst is used in an amount of 1.2 mol or more per mole of the vinyl ester component contained in the ethylene-vinyl ester copolymer, and the solution is irradiated with ultrasonic waves or microwaves.

In addition to (i) the copolymerization step of copolymerizing ethylene with vinyl ester to obtain an ethylene-vinyl ester copolymer and (ii) the saponification step of saponifying the ethylene-vinyl ester copolymer with an alkali catalyst, the production of the EVOH of the present invention also preferably comprises: (iii) a pelletization step of performing pelletizing operation to obtain hydrous pellets; and (iv) a drying step of drying the hydrous pellets to obtain an EVOH. Hereinafter, each step will be described.

<(i) Copolymerization Step>

The copolymerization step also includes, in addition to copolymerizing ethylene with vinyl ester, adding a polymerization inhibitor as needed and subsequently removing unreacted ethylene and unreacted vinyl ester to obtain an ethylene-vinyl ester copolymer solution. Examples of the method of copolymerizing ethylene with vinyl ester may include known methods, such as solution polymerization, suspension polymerization, emulsion polymerization, and bulk polymerization, and solution polymerization is preferred. The vinyl ester is preferably an aliphatic vinyl ester such as vinyl acetate, vinyl propionate, and vinyl pivalate, more preferably vinyl acetate. A small amount of other monomers capable of copolymerizing with ethylene and vinyl ester may be copolymerized, as long as the effects of the present invention are not impaired. The polymerization temperature is preferably from 20 to 90° C., more preferably from 40 to 70° C. The polymerization time is generally from 2 to 15 hours. The polymerization rate is preferably from 10% to 90% relative to the charged vinyl ester, more preferably from 30% to 80%. A resin content in the reaction solution after polymerization is generally from 5 to 85 mass %.

In the copolymerization step, an azonitrile compound containing an alkoxy group is used as a polymerization initiator. Examples of the azonitrile compound containing an alkoxy group preferably used in the present invention include 2,2'-azobis(4-methoxy-2,4-dimethylvaleronitrile) and 2,2'-azobis(4-ethoxy-2,4-dimethylvaleronitrile). Among them, 2,2'-azobis(4-methoxy-2,4-dimethylvaleronitrile) is preferred. Such an azonitrile compound containing an alkoxy group is unlikely to undergo abnormal decomposition due to contact with metals and has a high degradation rate at low temperatures. Accordingly, ethylene can be copolymerized with vinyl ester safely, efficiently, and economically by using the azonitrile compound. Specifically, it is preferred to copolymerize ethylene with vinyl ester in a solution using the azonitrile compound containing an alkoxy group as a polymerization initiator to obtain an ethylene-vinyl ester copolymer solution in the copolymerization step.

<(ii) Saponification Step>

Next, an alkali catalyst is added to the ethylene-vinyl ester copolymer solution, thereby saponifying the ethylene-vinyl ester copolymer in the solution, to obtain an ethylene-vinyl alcohol copolymer. The saponification step may be performed in a continuous or batch process. Examples of the alkali catalyst may include sodium hydroxide, potassium hydroxide, and alkali metal alcoholate. In order to control the molar ratio R [1/(1+II)] so as to satisfy formula (1), it is highly preferred to use the alkali catalyst in an amount of 1.2 mol or more per mole of the vinyl ester component contained in the ethylene-vinyl ester copolymer and irradiate the solution with ultrasonic waves or microwaves in the saponification step.

Here, it is more preferred to use the alkali catalyst in an amount of 2 mol or more per mole of the vinyl ester component. The irradiation method, the irradiation device to be used, and the irradiation location are not particularly limited, as long as the ethylene-vinyl ester copolymer solution (reaction solution) to which the alkali catalyst is added can be irradiated with one or more ultrasonic waves or microwaves in the saponification reaction. The wavelength and intensity of ultrasonic waves or microwaves for irradiation are also not particularly limited. The irradiation time is also not particularly limited, and irradiation with ultrasonic waves or microwaves may be performed during the time in at least a part of the saponification reaction. As described in detail in Examples, a method of irradiating the reaction solution with ultrasonic waves with an output of 80 W and a frequency of 40 kHz using an ultrasonic cleaner (US CLEANER USK-2R) for the last 15 to 60 minutes of the saponification reaction, a method of raising the temperature of the ethylene-vinyl ester copolymer solution (reaction solution) to which the alkali catalyst is added and then irradiating the reaction solution with microwaves with an output of 800 W and a frequency of 2450 MHz (2.45 GHz) using a microwave irradiation device (Multiwave 3000, available from Anton Paar GmbH) for 2 hours, and the like are employed, for example. After the saponifying step, the residual alkali catalyst is generally neutralized by adding acid, such as acetic acid.

<(iii) Pelletization Step>

The pelletization step can be performed, for example, by (1) a method of extruding the reaction solution obtained in the saponification step in a poor solvent at low temperatures to precipitate or solidify a copolymer and cutting it immediately after or after further cooling and solidification to obtain hydrous pellets, (2) a method of bringing the reaction solution obtained in the saponification step into contact with water vapor to form an aqueous resin composition in advance and then cutting it to obtain hydrous pellets, and (3) a method of adding water to the reaction solution obtained in the saponification step to precipitate a copolymer and then crushing the copolymer to obtain hydrous pellets. The moisture content of the hydrous pellets is generally 50 to 200 parts by mass with respect to 100 parts by mass of the EVOH.

<(iv) Drying Step>

The hydrous pellets obtained in the pelletization step are preferably subjected to the drying step to give dry pellets of the EVOH. The moisture content in the dry pellets is preferably 1.0 part by mass or less, more preferably 0.5 parts by mass or less, further preferably 0.3 parts by mass or less, with respect to 100 parts by mass of the EVOH, for preventing voids during molding. Examples of the drying method include ventilation drying and fluidized drying. One of these may be used singly, or a plurality of them may be used in combination. The drying step may be carried out either in a continuous or batch process, and when a plurality of drying methods are combined, either a continuous or batch process may be freely selected for each drying method. Carrying out the drying step at a low oxygen concentration or in an oxygen-free condition is preferred for reducing the degradation of the EVOH due to oxygen during drying.

The contents of the structure (I) and the structure (II) can be controlled by adjusting the amount of polymerization initiator to be used, the temperature and the time before the addition of the polymerization initiator, the polymerization temperature, the polymerization time, the polymerization rate, and the type and the amount of the polymerization solvent in the copolymerization step or adjusting the amount of the alkali catalyst or the irradiation with ultrasonic waves or microwaves in the saponification step. Further, the contents of the structure (I) and the structure (II) may vary in the pelletization step or the drying step.

Examples of the method for producing a resin composition by allowing the EVOH of the present invention to contain various components such as the metal ions and the carboxylic acid may include a method of mixing and melt-kneading the above pellets together with the various components, a method of mixing the various components in preparation of the pellets, a method of immersing the pellets in a solution containing the various components, and the like. The pellets to be used may be either hydrous pellets or dry pellets.

The EVOH of the present invention thus obtained has excellent viscosity stability at the initial stage of melting start and thus can stably produce shaped articles such as pellets, films, sheets, and containers.

EXAMPLES

The present invention is specifically described below by way of Examples. Note that the present invention is not limited at all by Examples below. In Examples or the like, measurement, analysis, and evaluation were performed by the following methods.

(1) Ethylene Unit Content and Saponification Degree of EVOH

The dry pellets obtained in each of Examples and Comparative Examples were dissolved in deuterated dimethyl sulfoxide (DMSO-$d_6$) containing tetramethylsilane (TMS) as an internal standard material and trifluoroacetic acid (TFA) as an additive and measured at 80° C. using a 500 MHz $^1$H-NMR ("GX-500" manufactured by JEOL Ltd.), to determine the ethylene unit content and the degree of saponification from the peak intensity ratio of the ethylene units, the vinyl alcohol units, and the vinyl ester units.

(2) Contents of Structure (I) and Structure (II)

The dry pellets obtained in each of Examples and Comparative Examples were dissolved in DMSO-$d_6$ containing TMS as an internal standard material and measured at 45° C. using a 500 MHz $^1$H-NMR ("GX-500" manufactured by JEOL Ltd.), to determine the contents of the structure (I) and the structure (II) from the peak intensity ratio of ethylene units, vinyl alcohol units, and vinyl ester units to the peak intensity of methyl hydrogens of the methoxy group or methylene hydrogens of the ethoxy group possessed by the structure (I) and the structure (II). The peaks of methyl hydrogens of the methoxy group possessed by the structure (I) and the structure (II) were respectively detected around 3.07 ppm and 3.09 ppm.

(3) Content of Metal Ions 0.5 g of the dry pellets obtained in each of Examples and Comparative Examples were put into a Teflon (registered trademark) pressure vessel, and 5 mL of concentrated nitric acid was added thereto, followed by standing at room temperature for 30 minutes. Thereafter, a lid was put thereon, and heat was applied at 150° C. for 10 minutes then at 180° C. for 5 minutes for wet decomposition, followed by cooling to room temperature. The process liquid thus obtained was poured into a 50 mL volumetric flask and diluted with pure water to prepare a solution. The solution was subjected to determination of the content of each metal ion using an ICP emission spectrophotometer. The contents of the phosphoric acid compound and the boron compound can be determined in the same manner.

(4) Content of Carboxylic Acid 10 g of the dry pellets obtained in each of Examples and Comparative Examples and 50 mL of pure water were put into a 100-mL Erlenmeyer flask with a ground-in stopper, and a reflux condenser was attached thereto, followed by heating at 95° C. for 8 hours and then cooling to 20° C. The extract obtained was titrated with a 0.02 mol/L sodium hydroxide aqueous solution using phenolphthalein as an indicator to quantify carboxylic acid.

(5) Evaluation of Viscosity Stability

The change in torque when 60 g of the dry pellets obtained in each of Examples and Comparative Examples were kneaded at 100 rpm and 230° C. using a (biaxial anisotropic) Labo Prastomill was measured. The ratio (TM/TI) of the maximum torque value TM from the start of kneading to 5 to 20 minutes to the average torque value TI from the start of kneading to 1 to 5 minutes was evaluated according to the following criteria A to D (the smaller the number, the better the viscosity stability) to be used as indices for viscosity stability.

A: Less than 1.10
B: 1.10 or more and less than 1.25
C: 1.25 or more and less than 1.40
D: 1.40 or more (6) Evaluation of Coloration Resistance Under Alkaline Conditions Using a thermocompression press, 10 g of the dry pellets obtained in each of Examples and Comparative Examples were heat-melted at 220° C. for 6 minutes to prepare a plurality of disk-shaped 3-mm thick test pieces. The test pieces obtained were immersed in 100 g of a 0.1 mol/L sodium hydroxide aqueous solution, and the container containing the test pieces with the lid closed was left standing at 80° C. for one week. The test pieces were taken out, and the degree of coloration was evaluated as visually compared with other test pieces separately immersed in pure water at 80° C. for one week according to the following criteria A to D to be used as indices for coloration resistance under alkaline conditions.

A: Visually almost indistinguishable
B: Slightly colored
C: Slightly colored (pale yellow)
D: Quite colored (yellow)

Synthesis Example 1

Using a pressure reaction vessel with a volume of 250 L, polymerization was performed using the following raw materials under the following conditions.

Vinyl acetate: 83.0 kg
Methanol: 26.6 kg
Polymerization initiator: 2,2'-azobis(4-methoxy-2,4-dimethylvaleronitrile) (2.5 g/L methanol solution) with an initial feeding amount of 362 mL and a continuous feeding amount of 1120 mL/hr
Polymerization temperature: 60° C.
Ethylene pressure in polymerization tank: 3.6 MPa When the polymerization rate of vinyl acetate reached approximately 40%, sorbic acid was added, followed by cooling to terminate the polymerization. Then, after the reaction vessel was opened to atmospheric pressure to remove ethylene from the reaction system, the reaction liquid was fed to a purge column, and methanol vapor was introduced from a lower portion of the column, thereby removing unreacted vinyl acetate from the column top, to obtain a methanol solution of the ethylene-vinyl acetate copolymer with an ethylene unit content of 32 mol %.

Synthesis Example 2

By the same operation as in Synthesis Example 1, except for changing the polymerization conditions as below, a methanol solution of the ethylene-vinyl acetate copolymer with an ethylene unit content of 24 mol % was obtained.

Vinyl acetate: 102.0 kg
Methanol: 17.7 kg
Polymerization initiator: 2,2'-azobis(4-methoxy-2,4-dimethylvaleronitrile) (2.5 g/L methanol solution) with an initial feeding amount of 280 mL and a continuous feeding amount of 850 mL/hr
Ethylene pressure in polymerization tank: 2.9 MPa Synthesis Example 3

By the same operation as in Synthesis Example 1, except for changing the polymerization conditions as below, a methanol solution of the ethylene-vinyl acetate copolymer with an ethylene unit content of 27 mol % was obtained.
Vinyl acetate: 85.2 kg
Methanol: 32.3 kg
Polymerization initiator: 2,2'-azobis(4-methoxy-2,4-dimethylvaleronitrile) (2.5 g/L methanol solution) with an initial feeding amount of 310 mL and a continuous feeding amount of 950 mL/hr
Ethylene pressure in polymerization tank: 2.9 MPa Synthesis Example 4

By the same operation as in Synthesis Example 1, except for changing the polymerization conditions as below, a methanol solution of the ethylene-vinyl acetate copolymer with an ethylene unit content of 44 mol % was obtained.
Vinyl acetate: 76.7 kg
Methanol: 11.0 kg
Polymerization initiator: 2,2'-azobis(4-methoxy-2,4-dimethylvaleronitrile) (2.5 g/L methanol solution) with an initial feeding amount of 510 mL and a continuous feeding amount of 1570 mL/hr
Ethylene pressure in polymerization tank: 5.5 MPa Synthesis Example 5

By the same operation as in Synthesis Example 1, except for changing the polymerization conditions as below, a methanol solution of the ethylene-vinyl acetate copolymer with an ethylene unit content of 32 mol % was obtained.
Vinyl acetate: 83.0 kg
Methanol: 20.8 kg
Polymerization initiator: 2,2'-azobis(4-methoxy-2,4-dimethylvaleronitrile) (2.5 g/L methanol solution) with an initial feeding amount of 1450 mL and a continuous feeding amount of 4360 mL/hr
Ethylene pressure in polymerization tank: 3.8 MPa Example 1

The methanol solution of the ethylene-vinyl acetate copolymer obtained in Synthesis Example 1 was put into a saponification reactor, then a 2 mol/L methanol solution of sodium hydroxide (NaOH) was added so that a molar ratio (NaOH/vinyl ester units) of sodium hydroxide to vinyl ester components in the copolymer was 3, and methanol was further added thereto to adjust the copolymer concentration to 5 mass %. This solution was heated to 60° C. for saponification reaction for 3 hours under stirring. At this time, the reaction solution was irradiated with ultrasonic waves via a reactor with an output of 80 W and a frequency of 40 kHz using an ultrasonic cleaner "US CLEANER USK-2R" for the last 1 hour of the reaction. The saponification reaction was then terminated by adding acetic acid and water to precipitate an EVOH. The EVOH precipitated was collected and finely crushed to obtain hydrous pellets, which were washed using an aqueous acetic acid solution and deionized water and further immersed in an aqueous solution containing sodium acetate and acetic acid. The hydrous pellets were separated from the aqueous solution, deliquored, and then put into a hot air dryer for drying at 80° C. for 3 hours and then at 110° C. for 35 hours, to obtain the resin composition of the present invention as dry pellets. The dry pellets obtained were analyzed and evaluated as described above. In the immersion process, the concentrations of sodium acetate and acetic acid in the aqueous solution were adjusted to obtain a resin composition with contents of sodium and acetic acid, respectively, of 180 ppm and 300 ppm.

Example 2

Dry pellets were produced by the same operation as in Example 1, except for adding a 2 mol/L methanol solution of sodium hydroxide so that a molar ratio (NaOH/vinyl ester units) of sodium hydroxide to the vinyl ester components in the copolymer was 1.5 and performing the irradiation with ultrasonic waves for the last 15 minutes of the saponification reaction, and were analyzed and evaluated.

Examples 3 to 5

Dry pellets were produced by the same operation as in Example 1, except for using the methanol solutions of the ethylene-vinyl acetate copolymer obtained in Synthesis Examples shown in Table 1, and were analyzed and evaluated.

Example 6

Dry pellets were produced by the same operation as in Example 1, except for using potassium acetate instead of sodium acetate and adjusting the concentrations of the components of the aqueous solution for immersion so that the contents of potassium and acetic acid were respectively 300 ppm and 300 ppm, and were analyzed and evaluated.

Example 7

The methanol solution of the ethylene-vinyl acetate copolymer obtained in Synthesis Example 1 was put into a polytetrafluoroethylene resin reactor, then a 2 mol/L methanol solution of sodium hydroxide (NaOH) was added so that a molar ratio (NaOH/vinyl ester unit) of sodium hydroxide to vinyl ester components in the copolymer was 3, and methanol was further added thereto to adjust the copolymer concentration to 5%. The solution obtained was allowed to stand in a microwave irradiation device (Multiwave 3000, available from Anton Paar GmbH) and sealed, and stirring was started. The output was set to 800 W, and the temperature was raised up to 60° C., which were maintained for 2 hours. Here, the frequency of the microwaves used for irradiating the reaction solution was 2450 MHz (2.45 GHz). Thereafter, the reactor was taken out of the microwave irradiation device, followed by cooling at room temperature, and then acetic acid and water were added thereto to stop the saponification reaction and precipitate an EVOH. The EVOH precipitated was collected and finely crushed to obtain hydrous pellets, which were washed using an aqueous acetic acid solution and deionized water and further immersed in an aqueous solution containing sodium acetate and acetic acid. The hydrous pellets were separated from the aqueous solution, deliquored, and then put into a hot air dryer for drying at 80° C. for 3 hours and then at 110° C. for 35 hours, to obtain the resin composition of the present invention as dry pellets. The dry pellets obtained were analyzed and evaluated as described above. In the immersion process, the concentrations of sodium acetate and acetic acid in the aqueous solution were adjusted to obtain a resin composition with contents of sodium and acetic acid, respectively, of 180 ppm and 300 ppm.

Comparative Example 1

Dry pellets were produced by the same operation as in Example 1, except for adding a 2 mol/L methanol solution of sodium hydroxide so that a molar ratio (NaOH/vinyl ester units) of sodium hydroxide to the vinyl ester components in the copolymer was 0.8 and omitting the irradiation with ultrasonic waves, and were analyzed and evaluated.

Comparative Example 2

Dry pellets were produced by the same operation as in Example 1, except for using the methanol solution of the ethylene-vinyl acetate copolymer obtained in Synthesis Example 5, and were analyzed and evaluated.

Comparative Example 3

Dry pellets were produced by the same operation as in Comparative Example 1, except for using the methanol solution of the ethylene-vinyl acetate copolymer obtained in Synthesis Example 5, and were analyzed and evaluated.

Table 1 shows the contents of the structures (I) and (II) in the resin composition obtained in each of Examples and Comparative Examples, and the ratio and evaluation results thereof. The resin compositions of the present invention having a total content of the structure (I) and the structure (II) of 0.002 to 0.020 mol % and satisfying formula (1) above exhibited excellent viscosity stability at the initial stage of melting start. Further, these resin compositions also had excellent appearance properties after melt molding. Meanwhile, the resin compositions of Comparative Examples had a significant change in viscosity at the initial stage of melting start, and the melt molding process was unstable.

TABLE 1

| | Saponification | | | EVOH | | | | | | Evaluation | |
|---|---|---|---|---|---|---|---|---|---|---|---|
| | Synthesis Example | NaOH/ vinyl ester units | Irradiation | Et mol % | Saponification degree mol % | Structure (I) mol % | Structure (II) mol % | (I) + (II) mol % | [I/(I + II)] — | R + Et/100 — | Viscosity stability — | Coloration resistance — |
| Example 1 | 1 | 3 | Ultrasonic waves[1] | 32 | 99.9 or more | 0.0071 | 0.0027 | 0.010 | 0.72 | 1.04 | A | B |
| Example 2 | 1 | 1.5 | Ultrasonic waves[2] | 32 | 99.9 or more | 0.0054 | 0.0047 | 0.010 | 0.53 | 0.85 | B | B |
| Example 3 | 2 | 3 | Ultrasonic waves[1] | 24 | 99.9 or more | 0.0033 | 0.0009 | 0.004 | 0.78 | 1.02 | A | A |
| Example 4 | 3 | 3 | Ultrasonic waves[1] | 27 | 99.9 or more | 0.0050 | 0.0017 | 0.007 | 0.75 | 1.02 | A | A |
| Example 5 | 4 | 3 | Ultrasonic waves[1] | 44 | 99.9 or more | 0.0081 | 0.0064 | 0.014 | 0.56 | 1.00 | A | C |
| Example 6 | 1 | 3 | Ultrasonic waves[1] | 32 | 99.9 or more | 0.0070 | 0.0027 | 0.010 | 0.72 | 1.04 | A | B |
| Example 7 | 1 | 3 | Microwaves[3] | 32 | 99.9 or more | 0.0070 | 0.0028 | 0.010 | 0.71 | 1.03 | A | B |
| Comparative Example 1 | 1 | 0.8 | None | 32 | 99.9 or more | 0.0045 | 0.0057 | 0.010 | 0.44 | 0.76 | C | C |
| Comparative Example 2 | 5 | 3 | Ultrasonic waves[1] | 32 | 99.9 or more | 0.0147 | 0.0063 | 0.021 | 0.70 | 1.02 | C | D |
| Comparative Example 3 | 5 | 0.8 | None | 32 | 99.9 or more | 0.0090 | 0.0120 | 0.021 | 0.43 | 0.75 | D | D |

[1] 80 W, 40 kHz, 1 hr,

[2] 80 W, 40 kHz, 15 min,

[3] 800 W, 2450 MHz, 1 hr

The invention claimed is:

1. An ethylene-vinyl alcohol copolymer having an ethylene unit content from 15 to 60 mol % and a saponification degree of 85 mol % or more, wherein
the copolymer comprises a molecule having a structure (I) below at an end and a molecule having a structure (II) below at an end,
a total content of the structure (I) and the structure (II) in all monomer units is from 0.002 to 0.020 mol %, and
a molar ratio R [I/(I+II)] of the structure (I) to the total of the structure (I) and the structure (II) satisfies formula (1) below:

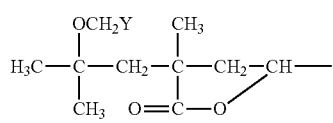 (I)

wherein Y represents a hydrogen atom or a methyl group;

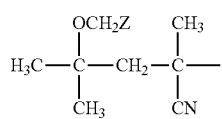 (II)

wherein Z represents a hydrogen atom or a methyl group; and $$0.8 < R + Et/100 \quad (1)$$

wherein Et represents the ethylene unit content (mol %).

2. The ethylene-vinyl alcohol copolymer according to claim 1, satisfying formula (2) below:

$$0.9 < R + Et/100 \quad (2)$$

wherein R and Et are the same as in formula (1).

3. A resin composition comprising:
the ethylene-vinyl alcohol copolymer according to claim 1; and
100 to 400 ppm of metal ions.

4. The resin composition according to claim 3, comprising:
50 to 400 ppm of carboxylic acid.

5. A shaped article comprising:
the ethylene-vinyl alcohol copolymer according to claim 1.

6. A shaped article comprising:
the resin composition according to claim 3.

7. A method for producing the ethylene-vinyl alcohol copolymer according to claim 1, comprising:
a copolymerization step of obtaining an ethylene-vinyl ester copolymer solution by copolymerization of ethylene with vinyl ester in a solution using an azonitrile compound containing an alkoxy group as a polymerization initiator; and
a saponification step of obtaining the ethylene-vinyl alcohol copolymer by saponification of the ethylene-vinyl ester copolymer in the solution with an alkali catalyst, wherein
in the saponification step, the alkali catalyst is used in an amount of 1.2 mol or more per mole of vinyl ester component contained in the ethylene-vinyl ester copolymer, and
the solution is irradiated with ultrasonic waves or microwaves.

* * * * *